(12) United States Patent
Guan et al.

(10) Patent No.: US 12,392,665 B1
(45) Date of Patent: Aug. 19, 2025

(54) WATER-MIST-PENETRATING THREE-WAVELENGTH TEMPERATURE MEASUREMENT DEVICE AND METHOD FOR HIGH-TEMPERATURE ENVIRONMENT

(71) Applicant: Shanghai Jiao Tong University, Shanghai (CN)

(72) Inventors: Xinping Guan, Shanghai (CN); Tiankai Jin, Shanghai (CN); Yuheng Qin, Shanghai (CN); Kaijie Wu, Shanghai (CN); Xiaojing Wen, Shanghai (CN); Cailian Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 19/071,370

(22) Filed: Mar. 5, 2025

(30) Foreign Application Priority Data

Jan. 24, 2025 (CN) .......................... 202510121008.1

(51) Int. Cl.
*G01J 5/08* (2022.01)
*G01J 5/061* (2022.01)
(Continued)

(52) U.S. Cl.
CPC .............. *G01J 5/0879* (2022.01); *G01J 5/061* (2013.01); *G01J 5/0802* (2022.01);
(Continued)

(58) Field of Classification Search
CPC ........ G01J 5/0879; G01J 5/061; G01J 5/0802; G01J 5/0814; G01J 5/0875; G01J 5/10
See application file for complete search history.

(56) References Cited

U.S. PATENT DOCUMENTS

| 2,808,353 | A | * | 10/1957 | Leffingwell | .......... C21D 8/0405 |
| | | | | | 148/610 |
| 9,761,360 | B2 | * | 9/2017 | Takenaka | .................. H01F 1/16 |

(Continued)

FOREIGN PATENT DOCUMENTS

| CN | 101943604 A | * | 1/2011 | ................ G01J 5/00 |
| CN | 102460527 B | * | 6/2015 | ........... G01N 21/538 |

(Continued)

*Primary Examiner* — Tung S Lau
(74) *Attorney, Agent, or Firm* — Blank Rome LLP

(57) ABSTRACT

A water-mist-penetrating three-wavelength temperature measurement device and method for a high-temperature environment, the device including a housing, a three-waveband beam splitting detection module and a computing unit, the housing provided with an optical aperture, the three-waveband beam splitting detection module arranged in the housing, and including a trichroic prism, three radiation detection assemblies, the trichroic prism able to receive the light signals entering via the optical aperture, and emit radiation signals having different wavelength bands through three emission faces, respectively; the three radiation detection assemblies able to receive radiation signals having different wavelength bands emitted from corresponding emission faces, and convert them into electrical signals, respectively; the computing unit able to receive the electrical signals, and perform calculation and analysis to determine a temperature value of a target to be measured; the method including: temperature measurement data acquisition, data fusion, parameter tuning, and model application.

20 Claims, 6 Drawing Sheets

(51) Int. Cl.
     *G01J 5/0802*      (2022.01)
     *G01J 5/0875*      (2022.01)
     *G01J 5/10*      (2006.01)

(52) U.S. Cl.
     CPC ........... *G01J 5/0814* (2022.01); *G01J 5/0875* (2013.01); *G01J 5/10* (2013.01)

(56) References Cited

U.S. PATENT DOCUMENTS

| | | | |
|---|---|---|---|
| 9,962,760 B2 * | 5/2018 | Tanaka | B22D 11/001 |
| 2009/0323192 A1 * | 12/2009 | Towndrow | G02B 23/08 |
| | | | 359/634 |
| 2015/0369565 A1 * | 12/2015 | Kepler | G02B 27/106 |
| | | | 348/143 |

FOREIGN PATENT DOCUMENTS

| | | | | |
|---|---|---|---|---|
| CN | 104833655 A | * | 8/2015 | ........... G01N 21/538 |
| CN | 112964365 A | | 6/2021 | |
| CN | 113758573 A | | 12/2021 | |
| CN | 221238540 U | * | 6/2024 | ................ G01J 5/53 |
| EP | 2307917 A1 | * | 4/2011 | ........... G02B 27/145 |
| WO | WO 2015/196178 A2 | * | 12/2015 | ................ F41G 1/38 |

* cited by examiner

WATER-MIST-PENETRATING THREE-WAVELENGTH TEMPERATURE MEASUREMENT DEVICE AND METHOD FOR HIGH-TEMPERATURE ENVIRONMENT

RELATED APPLICATION

This application claims priority to Chinese Application No. 202510121008.1, filed Jan. 24, 2025. The contents of this application is hereby incorporated by reference in its entirety.

FIELD OF THE INVENTION

The present application relates to the field of high-temperature industrial production, and in particular to a water-mist-penetrating three-wavelength temperature measurement device and method for a high-temperature environment.

DESCRIPTION OF THE PRIOR ART

In a high-temperature industrial production environment (for example, scenarios such as steel rolling, non-ferrous metal smelting, etc.), temperature is a crucial parameter to determine product quality and production efficiency, and directly affects the structure uniformity, mechanical property, and subsequent processing characteristic of a workpiece. Thus, during a high-temperature process, it is very important to accurately measure the temperature of a material. That, on the one hand, facilitates technical process optimization and energy consumption reduction, and, on the other hand, provides reliable data support for increasing product quality. However, such a high-temperature environment, often accompanying by extreme conditions such as high-temperature radiation, strong water mist disturbance, dust coverage, and oxide scale peeling, imposes severe challenges to the accuracy and stability of a conventional temperature measurement technique. Accordingly, a novel high-accuracy temperature measurement technique which is developed for complex on-site environments is a major concern for industrial development.

A single-wavelength infrared temperature measurement technique, which is a temperature measurement method applied earliest in industrial sites, has a simple structure. However, the technique relies on fixed emissivity, and is difficult to adapt to the emissivity fluctuation of a surface to be measured due to change or uneven coverage of an oxide film. By contrast, a dual-wavelength ratio temperature measurement technique partially solves the problem of emissivity dependence, but in practical applications, it is still limited by the non-uniformity of signal attenuation in a complex environment. This error increases with the environment, particularly in a dynamic working condition, thereby limiting the effect of the dual-wavelength technique. Therefore, an important technical problem to be solved is raised: how to design a temperature measurement technique having both high accuracy and strong environmental adaptability.

Given the situation above, a three-wavelength temperature measurement technique is gradually applied as an improved solution in industrial sites. The three-wavelength technique, by introducing a radiation signal at a third wavelength, can achieve multi-parameter coupling and resolution, effectively enhancing an anti-disturbance capability in a complex environment. For example, Chinese Patent Application No. 202111016320.2 provides a three-wavelength colorimetric infrared temperature measurement system, method, and device based on emissivity iteration, wherein a beam splitting mirror and a reflecting mirror are used to measure radiation signals at three wave bands having relatively different wavelengths, and different penetration characteristics and detection characteristics for different wavelengths is utilized in combination with an emissivity iteration algorithm, so as to fit a true temperature to increase measurement accuracy. Chinese Patent Application No. 202110168504.4 provides a three-wavelength-radiation temperature measurement device and method for a turbine blade, wherein radiation energies at three wave bands and an environmental energy are acquired, and an L-M algorithm with split-step search is utilized to achieve inversion for radiation temperature under unknown emissivity.

Although the three-wavelength temperature measurement technique increases temperature measurement accuracy and environmental adaptability to some extent, the prior art still has shortcomings in several aspects. On the one hand, most solutions have the assumption that the emissivities are the same at different wavebands, ignoring the non-uniform attenuation of signals at different wave bands due to water mist and dust in a complex environment, so that a temperature measurement result is prone to have an error under dynamic working conditions. On the other hand, some solutions often need to further acquire environmental parameters or introduce complex calculation algorithms to achieve relatively high measurement accuracy, thereby not only increasing system complexity, but also limiting the efficiency for real-time temperature measurement. Moreover, currently, most researches and technical applications mainly focus on temperature measurement demands under static conditions, and have insufficient adaptability when being directly applied to dynamic, large-area, and high-temperature scenarios such as steel hot rolling.

SUMMARY OF THE INVENTION

In view of the defects described above in the prior art, the present application solves the technical problem of low temperature measurement accuracy due to a severe water mist or dust disturbance.

To achieve the above purpose, the present application provides a water-mist-penetrating three-wavelength temperature measurement device for a high-temperature environment, comprising:
 a housing, the housing provided with an optical aperture, the aperture configured to be able to permit passage of light signals emitted from a target to be measured;
 a three-waveband beam splitting detection module, the three-waveband beam splitting detection module arranged in the housing, and comprising a trichroic prism, a first radiation detection assembly, a second radiation detection assembly and a third radiation detection assembly; the trichroic prism having an incident face, a first emission face, a second emission face, and a third emission face, and configured to be able to receive the light signals entering via the optical aperture through the incident face, and emit radiation signals having different wavelength bands through the first emission face, the second emission face, and the third emission face, respectively; the first radiation detection assembly configured to be able to receive a first radiation signal having a first wavelength band emitted from the first emission face, and convert the first radiation signal into a first electrical signal; the second radiation detection assembly configured to be able to receive a second radiation signal having a second wavelength band emitted from the second emission face, and convert the second radiation signal into a second electrical signal; the third radiation detection assembly configured to be able to receive a third radiation signal having a third wavelength band emitted from the third emission face, and convert the third radiation signal into a third electrical signal; and a computing unit, the computing unit configured to be able to receive the first electrical signal, the second electrical signal, and the third electrical signal, and perform calculation and analysis to determine a temperature value of the target to be measured.

Furthermore, the first emission face is provided with a first radiation filtering film, the first radiation filtering film is configured to be able to permit transmission of the first radiation signal having the first wavelength band; the second emission face is provided with a second radiation filtering film, the second radiation filtering film is configured to be able to permit transmission of the second radiation signal having the second wavelength band; and the third emission face is provided with a third radiation filtering film, the third radiation filtering film is configured to be able to permit transmission of the third radiation signal having the third wavelength band.

Furthermore, the first radiation detection assembly comprises a first focusing lens, a first radiation detector, a first circuit board, and a first stray light shielding tube, the first radiation detector is arranged on the first circuit board, the first focusing lens and the first radiation detector are sleeved in the first stray light shielding tube, the first circuit board is electrically connected to the computing unit, the first focusing lens is configured to be able to receive the first radiation signal emitted from the first emission face and concentrate the first radiation signal onto the first radiation detector, the first radiation detector is configured to be able to convert the received first radiation signal into the first electrical signal, the first circuit board is configured to be able to transmit the first electrical signal to the computing unit; the second radiation detection assembly comprises a second focusing lens, a second radiation detector, a second circuit board, and a second stray light shielding tube, the second radiation detector is arranged on the second circuit board, the second focusing lens and the second radiation detector are sleeved in the second stray light shielding tube, the second circuit board is electrically connected to the computing unit, the second focusing lens is configured to be able to receive the second radiation signal emitted from the second emission face and concentrate the second radiation signal onto the second radiation detector, the second radiation detector is configured to be able to convert the received second radiation signal into the second electrical signal, the second circuit board is configured to be able to transmit the second electrical signal to the computing unit; and the third radiation detection assembly comprises a third focusing lens, a third radiation detector, a third circuit board, and a third stray light shielding tube, the third radiation detector is arranged on the third circuit board, the third focusing lens and the third radiation detector are sleeved in the third stray light shielding tube, the third circuit board is electrically connected to the computing unit, the third focusing lens is configured to be able to receive the third radiation signal emitted from the third emission face and concentrate the third radiation signal onto the third radiation detector, the third radiation detector is configured to be able to convert the received third radiation signal into the third electrical signal, the third circuit board is configured to be able to transmit the third electrical signal to the computing unit.

Furthermore, the device further comprises a video monitoring module, the video monitoring module comprising a camera and a first semi-transparent and semi-reflective mirror; the first semi-transparent and semi-reflective mirror arranged between the optical aperture and the trichroic prism, and configured to able to transmit a part of the light signals to the trichroic prism, and reflect the other part of the light signals and transfer it to the camera; and the camera configured to be able to receive the light signals to achieve imaging.

Furthermore, the device further comprises a laser indication module, the laser indication module comprising a laser illuminator and a second semi-transparent and semi-reflective mirror, the second semi-transparent and semi-reflective mirror arranged between the optical aperture and the trichroic prism, and configured to able to transmit the light signals to the trichroic prism, and reflect a laser signal emitted by the laser illuminator and project the laser signal onto the target to be measured via the optical aperture.

Furthermore, the device further comprises a monitor, the monitor electrically connected to the computing unit.

Furthermore, the optical aperture is provided with a quartz window.

Furthermore, the optical aperture is provided with a shoulder, and the quartz window is arranged onto the shoulder.

Furthermore, a protection sleeve is provided outside the housing surrounding the optical aperture.

Furthermore, the protection sleeve is provided with an air blow hole in its peripheral wall, and the air blow hole is connected to an air blowing device.

Furthermore, the protection sleeve is threadedly connected to the housing.

Furthermore, the device further comprises an electrical interface, the electrical interface being electrically connected to an external apparatus.

Furthermore, a water-cooling jacket is provided outside the housing.

The present application further provides a temperature measurement method using a water-mist-penetrating three-wavelength temperature measurement device for a high-temperature environment, the water-mist-penetrating three-wavelength temperature measurement device comprising:

a housing, the housing provided with an optical aperture, the aperture configured to be able to permit passage of light signals emitted from a target to be measured;

a three-waveband beam splitting detection module, the three-waveband beam splitting detection module arranged in the housing, and comprising a trichroic prism, a first radiation detection assembly, a second radiation detection assembly and a third radiation detection assembly; the trichroic prism having an incident face, a first emission face, a second emission face, and a third emission face, and configured to be able to receive the light signals entering via the optical aperture through the incident face, and emit radiation signals having different wavelength bands through the first emission face, the second emission face, and the third emission face, respectively; the first radiation detection assembly configured to be able to receive a first radiation signal having a first wavelength band emitted from the first emission face, and convert the first radiation signal into a first electrical signal; the second radiation detection assembly configured to be able to receive a second radiation signal having a second wavelength band emitted from the second emission face, and convert the second radiation signal into a second electrical signal; the third radiation detection assembly configured to be able to receive a third radiation signal having a third wavelength band emitted from the third emission face, and convert the third radiation signal into a third electrical signal;

a computing unit, the computing unit configured to be able to receive the first electrical signal, the second electrical signal, and the third electrical signal, and perform calculation and analysis to determine a temperature value of the target to be measured;

a video monitoring module, the video monitoring module comprising a camera and a first semi-transparent and semi-reflective mirror; the first semi-transparent and semi-reflective mirror arranged between the optical aperture and the trichroic prism, and configured to able to transmit a part of the light signals to the trichroic prism, and reflect the other part of the light signals and transfer it to the camera; and the camera configured to be able to receive the light signals to achieve imaging; and a laser indication module, the laser indication module comprising a laser illuminator and a second semi-transparent and semi-reflective mirror, the second semi-transparent and semi-reflective mirror arranged between the optical aperture and the trichroic prism, and configured to able to transmit the light signals to the trichroic prism, and reflect a laser signal emitted by the laser illuminator and project the laser signal onto the target to be measured via the optical aperture;

and the temperature measurement method comprising:

step 1. temperature measurement data acquisition: after an area to be measured is positioned by the laser indication module, receiving a radiation signal at a corresponding wavelength band and convert the radiation signal into a corresponding electrical signal, respectively, by the first radiation detection assembly, the second radiation detection assembly and the third radiation detection assembly, and after purging by an air purging device, obtaining an true temperature of the target to be measured by a ratio temperature measurement method by the computing unit;

step 2. temperature measurement data fusion: establishing a temperature measurement model by the computing unit based on on-site working conditions to fuse radiation energy ratios under three different wavelength combinations, so as to obtain a final temperature value;

step 3. temperature measurement parameter tuning: achieving optimal tuning of a temperature measurement model parameter by the computing unit based on a temperature measurement dataset constructed after data acquisition; and step 4: temperature measurement model application: in combination with the judgement for abnormally fluctuated temperature measurement data based on camera images, achieving a full-line application of the temperature measurement model by the computing unit, and updating the temperature measurement model parameter periodically.

Furthermore, in the step 1, the water-mist-penetrating three-wavelength temperature measurement device is utilized for temperature measurement data acquisition in an area having a water mist disturbance and provided with an air purging device, the target to be measured is positioned by the laser illuminator, and the first electrical signal, the second electrical signal and the third electrical signal converted from radiation signals received by the first radiation detection assembly, the second radiation detection assembly and the third radiation detection assembly are utilized to obtain radiation energies $M_i(\lambda_1,T_i)$, $M_i(\lambda_2,T_i)$, and $M_i(\lambda_3,T_i)$ for the first radiation signal, the second radiation signal and the third radiation signal in an i-th measurement, where $\lambda_1,\lambda_2,\lambda_3$ are central wavelengths allowed to transmit through a first radiation filtering film, a second radiation filtering film and a third radiation filtering film of the trichroic prism, respectively; and $T_i$ is the true temperature of the target to be measured in the i-th measurement, and, based on the ratio of radiation energies under two selected wavelengths $\lambda_m$, $\lambda_n$, m, n∈{1, 2,3} after purging by the air purging device, approximately is:

$$T_i = \frac{C_2\left(\frac{1}{\lambda_n} - \frac{1}{\lambda_m}\right)}{\ln\left(\frac{M_i(\lambda_m, T_i)}{M_i(\lambda_n, T_i)}\right) - 5\ln\left(\frac{\lambda_n}{\lambda_m}\right)},$$

where, $C_2$ is a second radiation constant.

Furthermore, in the step 2, the radiation energy ratios for the three different wavelength combinations are established in the same measurement based on a ratio temperature measurement principle:

$$R_i^{1,2} = \frac{M_i(\lambda_1, T_i)}{M_i(\lambda_2, T_i)}, R_i^{1,3} = \frac{M_i(\lambda_1, T_i)}{M_i(\lambda_3, T_i)}, R_i^{2,3} = \frac{M_i(\lambda_2, T_i)}{M_i(\lambda_3, T_i)}$$

considering the disturbance of water mist and vapor, affecting radiation at each wavelength, the emissivities, which are not exactly the same at different wavelengths, of the high-temperature target to be measured, and the varied temperature measurement accuracy for different wavelength combinations under various working conditions, a temperature measurement model f is established to obtain a final temperature measurement value $\hat{T}_i$:

$$\hat{T}_i = f(R_i^{1,2}, R_i^{1,3}, R_i^{2,3}, \alpha_i; \theta)$$

where, $\alpha \in \{1, 2, \ldots, N\}$ represents different production working conditions, and $\theta$ is a model parameter.

Furthermore, in the step 3, the computing unit stores related temperature measurement data, a dataset obtained based on L times of data acquisition is $\{T_i, M_i(\lambda_1, T_i), M_i(\lambda_2, T_i), M_i(\lambda_3, T_i), \alpha_i\}_{i=1}^L$, and an obtained optimal temperature measurement model parameter $\theta^*$ is:

$$\theta^* = \operatorname*{argmin}_{\theta} \sum_{i=1}^{L}\left(T_i - f(R_i^{1,2}, R_i^{1,3}, R_i^{2,3}, \alpha_i; \theta)\right)^2$$

where, a temperature measurement model f is established using a multilayer feed-forward network, and a neural-network temperature measurement model parameter $\theta$ is iteratively updated by means of gradient descent.

Furthermore, in the step 4, considering the correlation of similar area environments, the parameter of the temperature measurement model is configured to be able to be used in other section in a high-temperature environment where water mist and vapor disturbances exist and it is difficult to fully realize purging, to obtain the actual temperature of the target to be measured.

Furthermore, in the step 4, when an output of the temperature measurement model fluctuates abnormally, whether the target to be measured has an abnormal state and whether there is a severe water-vapor water-mist disturbance in a measurement light path are determined based on images acquired by the camera, and in combination with machine vision and expert experience; if the abnormal state or disturbance exists, the fluctuated data is discarded; if no abnormal state or disturbance exists, obtained temperature measurement data is accepted.

Furthermore, the step 4 further comprises: periodically updating the temperature measurement model parameter based on accumulated historical temperature measurement data.

To achieve the above purpose, in a first aspect, the present application provides a water-mist-penetrating three-wavelength temperature measurement device for a high-temperature environment, including a high-temperature measurement apparatus assembly and a housing;

the high-temperature measurement apparatus assembly includes a three-waveband beam splitting detection module, a data storage and processing analysis module, a data display and system setting module, a video monitoring and laser indication module, a front lens protective sleeve, and an electrical interface;

the three-waveband beam-splitting detection module includes a trichroic prism and three radiation detection assemblies, each emission face of the trichroic prism is coated with a different radiation filtering film, and the three radiation detection assemblies comprise focusing lenses, radiation detectors, circuit boards, and stray light shielding tubes; and light beams separated from the trichroic prism pass through the focusing lenses to concentrate light rays onto the radiation detectors, the radiation detectors convert the light rays into electrical signals, and then the circuit boards transmit the electrical signals to the data storage and processing analysis module.

The present application, utilizing the accurate beam splitting capability of the trichroic prism and radiation filtering films, achieves independent separation of light signals at specific wave bands, to eliminate a measurement disturbance caused by wavelength overlap, thereby increasing temperature measurement accuracy. The multi-waveband accurate light splitting technique and dynamic model optimization deal with a disturbance such as water mist, dust, etc., so that the device has a greatly reduced measurement error in dynamic high-temperature environments.

Furthermore, each emission face of the trichroic prism is coated with a radiation filtering film that only permits transmission of light at a specific wave band.

Furthermore, the data storage and processing analysis module comprises a processor responsible for receiving raw data from a radiation detection assembly, performing calculation and analysis to determine a temperature value, and storing data for subsequent read;

the data display and system setting module comprises a monitor and a button; and the video monitoring and laser indication module comprises a camera and a laser illuminator.

In the present application, the data storage and processing analysis module fuses and analyzes multi-wavelength data based on a real-time algorithm, and can dynamically adjust a model parameter to adapt it to different working conditions, thereby ensuring measurement accuracy in complex environments. In the present application, the design having multiple collaborative modules significantly increases the adaptability of the device to a temperature or humidity fluctuation and a disturbance factor, and is applicable to various complex industrial application scenarios.

Furthermore, the front lens protective sleeve includes a protective sleeve, a quartz window, and an air blowing hole; the protective sleeve is connected to a body of temperature measurement device via a thread; the quartz window protects the three-waveband beam splitting detection module; the air blowing hole is externally connected to an air blowing device; and the electrical interface includes a connection port to be externally connected to a power supply.

In the present application, the front lens protection sleeve equipped with the air blowing device and the design of the quartz window prevent dust and water mist from contaminating an optical element while ensuring a clean and transparent optical path, thereby retaining temperature measurement stability in high-temperature scenarios. The high-efficient purging for the protection sleeve and the water-cooling protection design reduce the frequency of contamination or damage of an optical system, thereby lowering the maintenance difficulty and use cost of the apparatus.

Furthermore, the high-temperature measurement apparatus assembly is contained in the housing, and a water-cooling jacket is provided outside the housing to isolate the high-temperature measurement apparatus assembly from a high-temperature environment.

In another aspect, the present application provides a method using the water-mist-penetrating three-wavelength temperature measurement device for a high-temperature environment as described in the first aspect, the temperature measurement method including:

step 1. temperature measurement data acquisition: after an area to be measured is positioned, three radiation detection assemblies receive a light signal at a corresponding wave band and convert the light signal into an electrical signal, respectively, and after purging by the air purging device, the true temperature of a target to be measured is obtained by a ratio temperature measurement method;

step 2. temperature measurement data fusion: a temperature measurement model is established based on on-site working conditions to fuse radiation energy ratios under three different wavelength combinations, so as to obtain a final temperature value;

step 3. temperature measurement parameter tuning: optimal tuning of a temperature measurement model parameter is achieved based on a temperature measurement dataset constructed after data acquisition; and step 4. temperature measurement model application: in combination with the judgement for abnormally fluctuated temperature measurement data, a full-line application of the temperature measurement model is achieved, and the temperature measurement model parameter is updated periodically.

The present application establishes ratio temperature measurement models for radiation signals under three different wave band combinations, respectively, achieving effective penetration and compensation of a signal disturbance due to water mist and vapor in complex environments. The temperature measurement model is established using a neural network, and the model parameter is dynamically optimized based on a dataset and updated periodically, so as to adapt to different industrial production modes and on-site working conditions. Based on the sharing of model parameters in similar environmental conditions, the applicability of the method is increased in a high-temperature scenario with water mist disturbances.

Furthermore, in the step 1, the water-mist-penetrating three-wavelength temperature measurement device for a high-temperature environment is utilized for data acquisition in an area having a water mist disturbance and provided with an air purging device, the target to be measured is accurately positioned by a laser illuminator, and electrical signals converted from light signals received by the three radiation detection assemblies are utilized to obtain radiation energies $M_i(\lambda_1,T_i)$, $M_i(\lambda_2,T_i)$, and $M_i(\lambda_3,T_i)$ for three light paths in the i-th measurement, where $\lambda_1,\lambda_2,\lambda_3$ are central wavelengths allowed to transmit through three radiation filtering films of the trichroic prism, respectively; and $T_i$ is the true temperature of the target to be measured in the i-th measurement, and, based on the ratio of radiation energies under two selected wavelengths $\lambda_m,\lambda_n, m,n \in \{1,2,3\}$ after purging by the air purging device provided in the area, approximately is:

$$T_i = \frac{C_2\left(\frac{1}{\lambda_n} - \frac{1}{\lambda_m}\right)}{\ln\left(\frac{M_i(\lambda_m, T_i)}{M_i(\lambda_n, T_i)}\right) - 5\ln\left(\frac{\lambda_n}{\lambda_m}\right)},$$

in the formula, $C_2$ is a second radiation constant.

Furthermore, in step 2, radiation energy ratios for three different wavelength combinations are established in the same measurement based on a ratio temperature measurement principle:

$$R_i^{1,2} = \frac{M_i(\lambda_1, T_i)}{M_i(\lambda_2, T_i)}, \quad R_i^{1,3} = \frac{M_i(\lambda_1, T_i)}{M_i(\lambda_3, T_i)}, \quad R_i^{2,3} = \frac{M_i(\lambda_2, T_i)}{M_i(\lambda_3, T_i)}.$$

Considering the disturbance such as water mist, vapor, etc. affecting radiation at each wavelength, the emissivities, which are not exactly the same at different wavelengths, of the high-temperature target to be measured, and the varied temperature measurement accuracy for different wavelength combinations under various working conditions (such as a production mode, ambient temperature and humidity, etc.), a temperature measurement model f is established to obtain a final temperature measurement value $\hat{T}_i$:

$$\hat{T}_i = f(R_i^{1,2}, R_i^{1,3}, R_i^{2,3}, \alpha_i; \theta)$$

in the formula, $\alpha \in \{1, 2, \ldots, N\}$ represents different production working conditions, and $\theta$ is a model parameter.

Furthermore, in step 3, the data storage and processing analysis module stores related temperature measurement data, a dataset obtained based on L times of data acquisition is $\{T_i, M_i(\lambda_1,T_i), M_i(\lambda_2,T_i), M_i(\lambda_3,T_i), \alpha_i\}_{i=1}^{L}$, and an obtained optimal temperature measurement model parameter $\theta^*$ is:

$$\theta^* = \arg\min_\theta \sum_{i=1}^{L} (T_i - f(R_i^{1,2}, R_i^{1,3}, R_i^{2,3}, \alpha_i; \theta))^2$$

in the formula, a temperature measurement model f is established using a multilayer feed-forward network, and a neural-network temperature measurement model parameter $\theta$ is iteratively updated by means of gradient descent.

Furthermore, in step 4, considering the correlation of similar area environments, the parameter of the temperature measurement model is applicable to other section in a high-temperature environment where water mist and vapor disturbances exist and it is difficult to fully realize purging, so as to obtain the actual temperature of the target to be measured.

In step 4, when an output of the temperature measurement model fluctuates abnormally, whether the target to be measured has an abnormal state and whether there is a severe water-vapor water-mist disturbance in a measurement light path are determined based on images acquired by the camera, and in combination with machine vision and expert experience; if the abnormal state or disturbance exists, the fluctuated data is discarded; if no abnormal state or disturbance exists, obtained temperature measurement data is accepted; and in addition, step 4 further includes periodically updating the temperature measurement model parameter based on accumulated historical temperature measurement data.

The temperature measurement method provided by the present application has the following technical effects:
1. Significantly Increased Temperature Measurement Accuracy: the method, by multiple-parameter fusion for three wavelength signals, greatly reduces the impacts of emissivity uncertainty and water mist and vapor disturbances on temperature measurement accuracy, thereby obviously reducing a temperature measurement error under a dynamic working condition;
2. Enhanced Environmental Adaptability: by data correction and model optimization, the method is adapted to various complex production working conditions, satisfying the demand for real-time, high-precision temperature measurement in dynamic high-humidity environments; and
3. Enriched Application Scenarios: the novel method can be expanded to other high-temperature environments having water mist disturbances, greatly increasing the general applicability and market potential of the temperature measurement device.

Compared with the prior art, the practicality of the present application is as follows.

The present application, by combining the three-wavelength temperature measurement technique with a learning algorithm, is comprehensively adapted to complex working conditions, such as a high temperature, water mist, dust, etc., in production environments. The application, especially in conjunction with the adaptive correction of a three-wavelength energy ratio fusion coefficient and an on-line model update mechanism, significantly reduces the temperature measurement error caused by an environmental change and a disturbance, and enables better measurement accuracy than the conventional dual-wavelength or single-wavelength technique.

The present application, by the design with the trichroic prism replacing multiple beam splitting/reflecting mirrors, has an integrated video monitoring and laser indication module to achieve hardware integration for acquiring multi-source information, reducing the dependency on an external measurement apparatus and multiple times of debugging to improve system stability and work efficiency.

The conception, specific structure, and generated technical effect of the present invention will be further described below with reference to the drawings, so as to fully understand the purpose, feature, and effect of the present invention.

Figure 1:
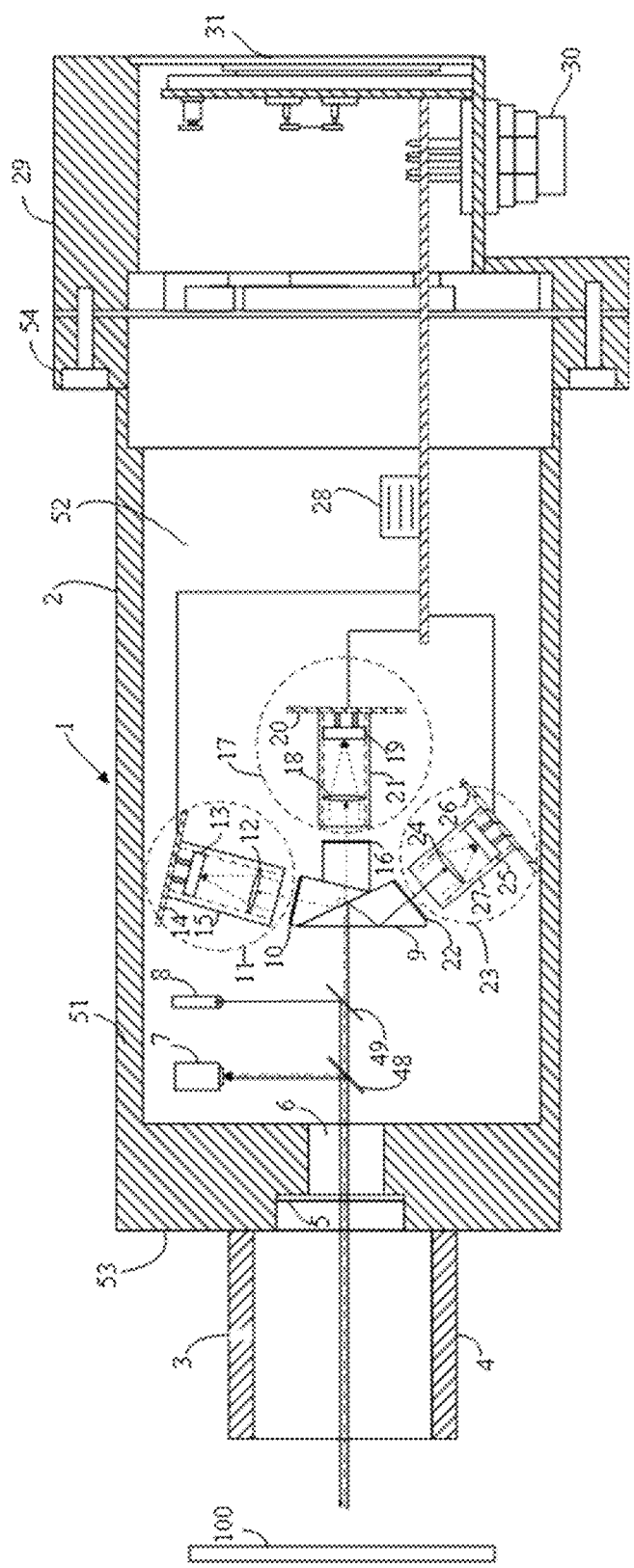
FIG. 1 is a schematic diagram of a water-mist-penetrating three-wavelength infrared temperature measurement device for a high-temperature environment according to an embodiment of the present application.

In which: 1—water-mist-penetrating three-wavelength temperature measurement device; 2—housing; 3—air blowing hole; 4—protection sleeve; 5—quartz window; 6—optical aperture; 7—camera; 8—laser illuminator; 9—trichroic prism; 10—first radiation filtering film; 11—first radiation detection assembly; 12—first focusing lens; 13—first radiation detector; 14—first circuit board; 15—first stray light shielding tube; 16—second radiation filtering film; 17—second radiation detection assembly; 18—second focusing lens; 19—second radiation detector; 20—second circuit board; 21—second stray light shielding tube; 22—third radiation filtering film; 23—third radiation detection assembly; 24—third focusing lens; 25—third radiation detector; 26—third circuit board; 27—third stray light shielding tube; 28—processor; 29—rear cover; 30—electrical interface; 31—monitor; 32—end-of-finishing-rolling rack; 33—air purging device; 34—laminar flow cooling nozzle; 35—coiler; 36—first temperature measurement area; 37—second temperature measurement area; 38—incident face; 39—first emission face; 40—second emission face; 41—third emission face; 42—first radiation signal; 43—second radiation signal; 44—third radiation signal; 45—first electrical signal; 46—second electrical signal; 47—third electrical signal; 48—first semi-transparent and semi-reflective mirror; 49—second semi-transparent and semi-reflective mirror; 50—shoulder; 51—water-cooling jacket; 52—interior space; 53—front portion; 54—rear portion; 55—laser signal; 100—target to be measured.

DETAILED DESCRIPTION OF THE PREFERRED EMBODIMENTS

A specified embodiment of the present invention is described below with reference to the drawings of the description, to clarify the technical content of the invention. The present invention may be embodied in many different forms of embodiments, and the scope of protection of the present invention is not limited to the embodiments mentioned herein.

In the drawings, components with the same structure are denoted by the same reference number, and various assemblies with similar structures or functions are denoted by similar reference numbers. The size and thickness of each assembly shown in the drawings are illustrated arbitrarily, and the present invention does not limit the size and thickness of each assembly. The thickness of the component is enlarged appropriately at some places in the drawings for clear illustration.

Figure 2:
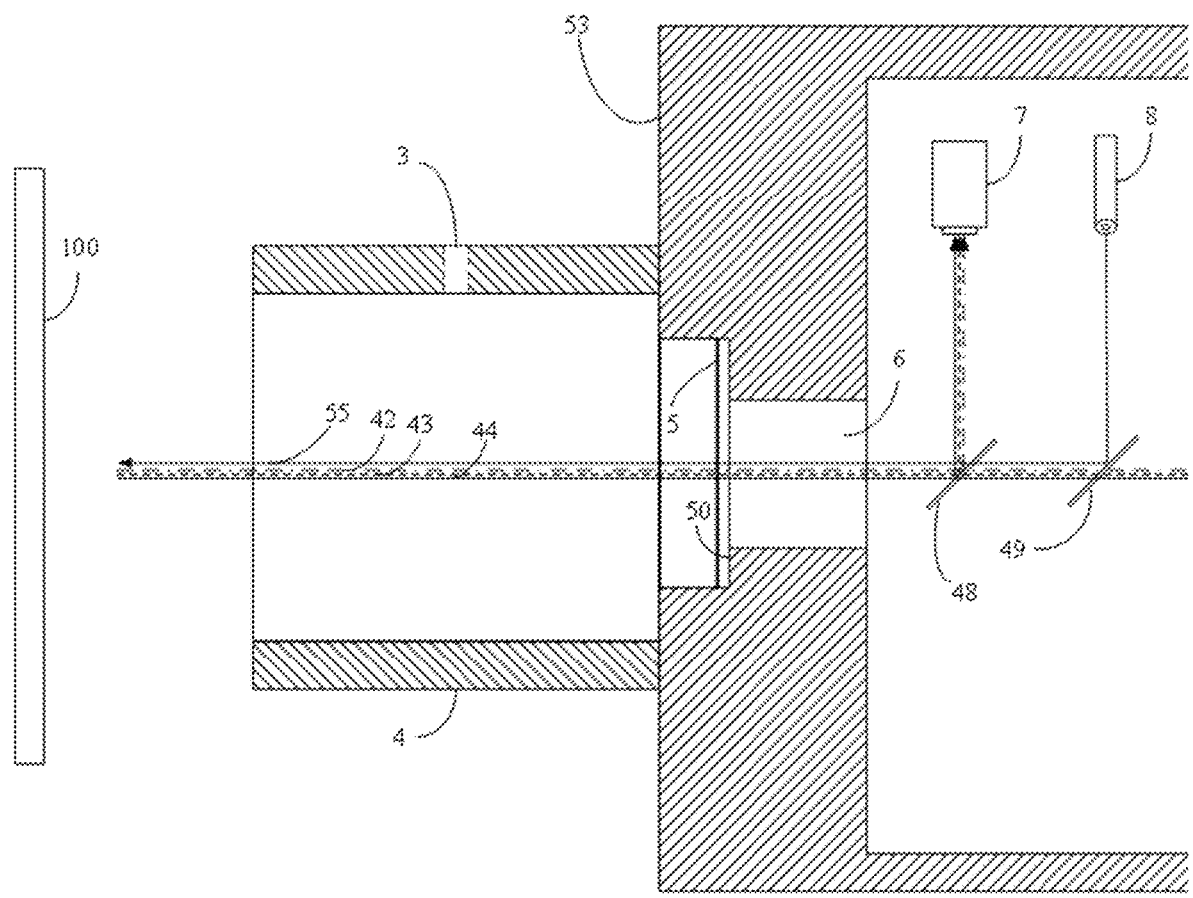
FIG. 2 is a schematic enlarged view of a protection sleeve in FIG. 1.
Figure 3:
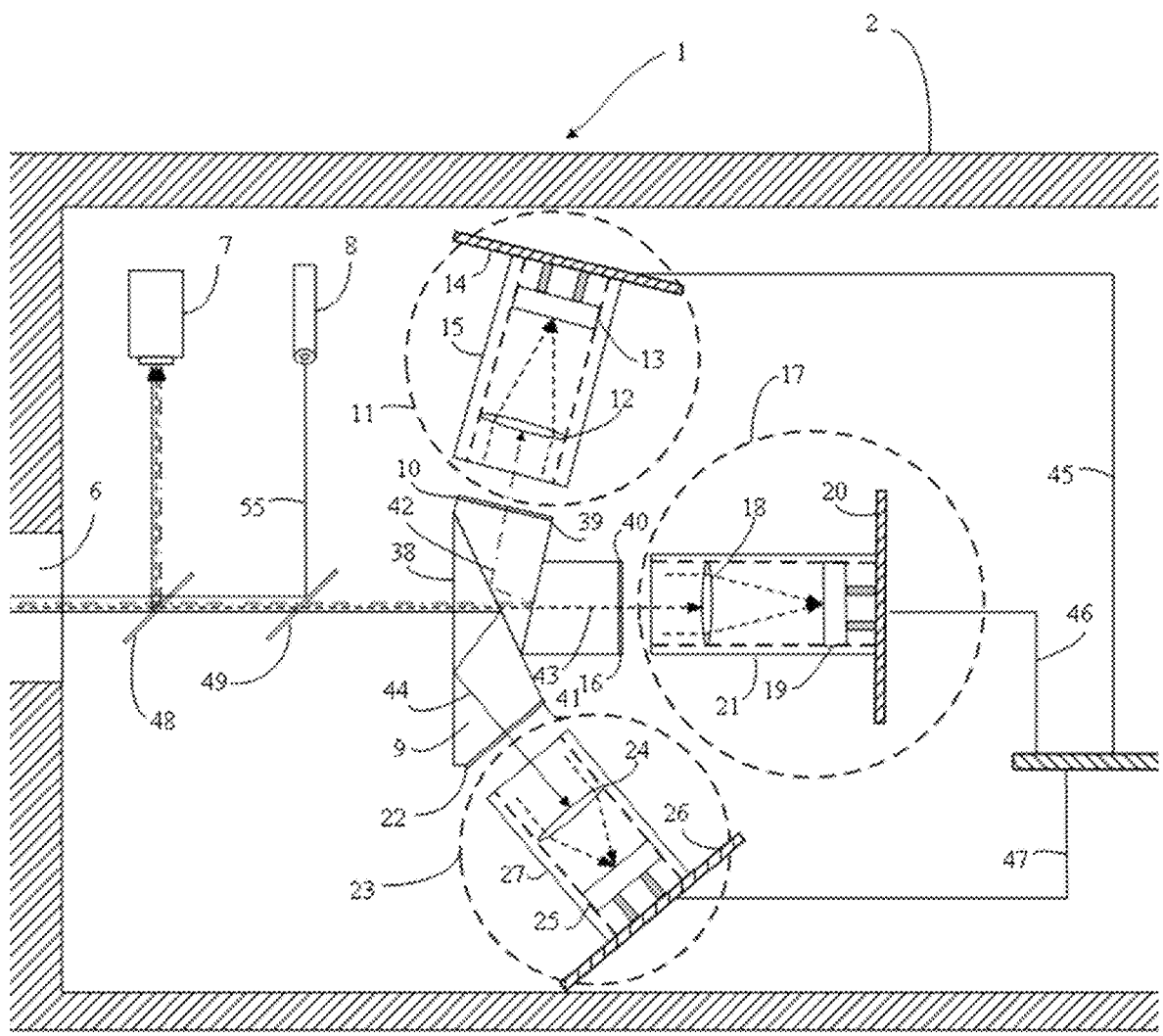
FIG. 3 is a schematic enlarged view of a three-waveband beam splitting detection module in FIG. 1.

As shown in FIGS. 1-3, in one aspect, the present application provides a water-mist-penetrating three-wavelength temperature measurement device 1 for a high-temperature environment, including a high-temperature measurement apparatus assembly and a housing 2. The high-temperature measurement apparatus assembly includes a three-waveband beam splitting detection module, a data storage and processing analysis module, a data display and system setting module, a video monitoring and laser indication module, a front lens protective sleeve, and an electrical interface 30.

The housing 2 has a front portion 53 and a rear portion 54 which are opposed to each other, and the front portion 53 faces a target to be measured 100. The front portion 53 of the housing 2 is provided with an optical aperture 6 which permits passage of light signals emitted from the target to be measured 100. The three-waveband beam splitting detection module and the video monitoring and laser indication module are arranged within the housing 2.

The three-waveband beam splitting detection module includes: a trichroic prism 9, which has an incident face 38, a first emission face 39, a second emission face 40, and a third emission face 41, and can receive the light signals entering via the optical aperture 6 through the incident face 38, and emit radiation signals having different wavelength bands through the first emission face 39, the second emission face 40, and the third emission face 41, respectively; the first radiation detection assembly 11 can receive a first radiation signal 42 (as indicated by dash-dotted lines in FIGS. 2 and 3) having a first wavelength $\lambda_1$ band emitted from the first emission face 39, and convert the first radiation signal 42 into a first electrical signal 45; the second radiation detection assembly 17 can receive a second radiation signal 43 (as indicated by dashed lines in FIGS. 2 and 3) having a second wavelength $\lambda_2$ band emitted from the second emission face 40, and convert the second radiation signal 43 into a second electrical signal 46; the third radiation detection assembly 23 can receive a third radiation signal 44 (as indicated by solid lines in FIGS. 2 and 3) having a third wavelength $\lambda_3$ band emitted from the third emission face 41, and convert the third radiation signal 44 into a third electrical signal 47; emission faces of which are coated with a first radiation filtering film 10, a second radiation filtering film 16, and a third radiation filtering film 22, respectively, to ensure that only light at a specific wavelength band can transmit through each emission face, wherein the first radiation filtering film 10 can permit transmission of the first radiation signal 42, the second radiation filtering film 16 can permit transmission of the second radiation signal 43, and the third radiation filtering film 23 can permit transmission of the third radiation signal 44; and three radiation detection assemblies, in which a first radiation detection assembly 11 includes a first focusing lens 12, a first radiation detector 13, a first circuit board 14, and a first stray light shielding tube 15; a second radiation detection assembly 17 includes a second focusing lens 18, a second radiation detector 19, a second circuit board 20, and a second stray light shielding tube 21; and a third radiation detection assembly 23 includes a third focusing lens 24, a third radiation detector 25, a third circuit board 26, and a third stray light shielding tube 27, to receive a radiation signal at a specific wave band and convert it into an electrical signal, respectively.

The data storage and processing analysis module serves as a computing unit, which can receive the first electrical signal 45, the second electrical signal 46, and the third electrical signal 47, and includes: a processor 28 responsible for receiving raw data from the first radiation detection assembly 11, the second radiation detection assembly 17, and the third radiation detection assembly 23, performing calculation and analysis to determine a temperature value of the target to be measured 100, and storing data for subsequent read.

The first radiation detector 13 is arranged on the first circuit board 14, the first focusing lens 12 and the first radiation detector 13 are sleeved in the first stray light shielding tube 15, the first circuit board 14 is electrically connected to the processor 28, the first focusing lens 12 can receive the first radiation signal 42 emitted from the first emission face 39 and concentrate the first radiation signal 42 onto the first radiation detector 13, the first radiation detector 13 can convert the received first radiation signal 42 into the first electrical signal 45, and the first circuit board 14 can transmit the first electrical signal 45 to the processor 28.

The second radiation detector 19 is arranged on the second circuit board 20, the second focusing lens 18 and the second radiation detector 19 are sleeved in the second stray light shielding tube 21, the second circuit board 20 is electrically connected to the processor 28, the second focusing lens 18 can receive the second radiation signal 43 emitted from the second emission face 40 and concentrate the second radiation signal 43 onto the second radiation detector 19, the second radiation detector 19 can convert the received second radiation signal 43 into the second electrical signal 46, the second circuit board 20 can transmit the second electrical signal 46 to the processor 28.

The third radiation detector 25 is arranged on the third circuit board 26, the third focusing lens 24 and the third radiation detector 25 are sleeved in the third stray light shielding tube 27, the third circuit board 26 is electrically connected to the processor 28, the third focusing lens 24 can receive the third radiation signal 44 emitted from the third emission face 41 and concentrate the third radiation signal 44 onto the third radiation detector 25, the third radiation detector 25 can convert the received third radiation signal 44 into the third electrical signal 47, the third circuit board 26 can transmit the third electrical signal 47 to the processor 28.

The data display and system setting module includes: a monitor 31 which provides a user interface, so that an operator can view a measurement result, set a parameter, and adjust a system setting or the like in real time via a display screen; and a set of buttons used for adjusting a temperature measurement model parameter under various working conditions. The monitor 31 and the buttons are electrically connected to the processor 28. The rear portion 54 of the housing 2 is configured with an open structure, wherein a rear cover 29 is mechanically coupled to the rear portion 54 of the housing 2 through bolt fasteners. The monitor 31 and the buttons are disposed on a rear-facing wall surface of the rear cover 29.

The video monitoring and laser indication module includes a video monitoring module and a laser indication module. The video monitoring module includes: a camera 7 and a first semi-transparent and semi-reflective mirror 48. The first semi-transparent and semi-reflective mirror 48 is arranged between the optical aperture 6 and the trichroic prism 9, and can transmit a part of the light signals to the trichroic prism 9, and reflect the other part of the light signals to the camera 7. The camera 7 can receive the light signals to achieve imaging, in which a light ray can be received by the camera 7 by adjusting a light path of a specific light ray to complete imaging, so that an operator can perform real-time remote monitoring of a situation of a temperature measurement point. The laser indication module includes a laser illuminator 8 and a second semi-transparent and semi-reflective mirror 49. The second semi-transparent and semi-reflective mirror 49 is arranged between the optical aperture 6 and the trichroic prism 9, and can transmit the light signals to the trichroic prism 9, and reflect a laser signal 55 emitted by the laser illuminator and project the laser signal 55 onto the target to be measured 100 via the optical aperture 6. A light path of the laser illuminator 8 is changed to accurately locate a measurement area.

The housing 2 and the end cover 29 collectively form an interior space 52, wherein the three-waveband beam splitting detection module, the video monitoring and laser indication module, and processor 28 are housed within the interior space 52.

The front lens protection sleeve includes: a protection sleeve 4, which is provided outside the housing 2 surrounding the optical aperture 6 and is tightly fitted to the housing 2 of a body of the temperature measurement device via a thread to protect an optical system from impacts of harsh environmental factors such as water mist, dust, etc.; a quartz window 5 arranged at the optical aperture 6, which is provided with a shoulder 50, the quartz window 5 can be arranged onto the shoulder 50, and the quartz window 5 can be embedded onto the shoulder 50 by using a thread screw, which is embedded between the protection sleeve 4 and the body of the temperature measurement device by using, but not limited to, a thread screw to keep the cleanliness and transparency of an optical path and protect the three-waveband beam splitting detection module; and an air blowing hole 3, which is provided in the peripheral wall of the protection sleeve 4, and is connected to an external air blowing device to prevent approaching of dust or water vapor, thereby ensuring that the measurement accuracy is not affected by external conditions.

The electrical interface 30 includes a standardized connection port connected to external apparatuses for power supply, data acquisition, remote control, etc. The electrical interface 30 is arranged at the rear cover 29.

Furthermore, emission faces of the trichroic prism 9 are coated with the specific first radiation filtering film 10, second radiation filtering film 16, and third radiation filtering film 22, these filtering films only permitting transmission of light at a specific wave band, to ensure that the first radiation detection assembly 11, the second radiation detection assembly 17, and the third radiation detection assembly 23 receive a light signal at a single wave band respectively.

Furthermore, a light beam separated from the trichroic prism 9 passes through the first focusing lens 12, the second focusing lens 18, and the third focusing lens 24, to concentrate a light ray onto the first radiation detector 13, second radiation detector 19, and third radiation detector 25, the first radiation detector 13, the second radiation detector 19, and the third radiation detector 25 convert light signals into electrical signals, and then the first circuit board 14, second circuit board 20, and third circuit board 26 transmit the electrical signals to the data storage and processing analysis module.

Furthermore, the data storage and processing analysis module is responsible for receiving raw data from the first radiation detection assembly 11, the second radiation detection assembly 17, and the third radiation detection assembly 23, and performing a related algorithm processing.

Furthermore, the high-temperature measurement apparatus assembly is contained in the housing 2, and the housing 2 may be provided with a water-cooling jacket to insulate the apparatus from a high temperature environment.

Figure 4:
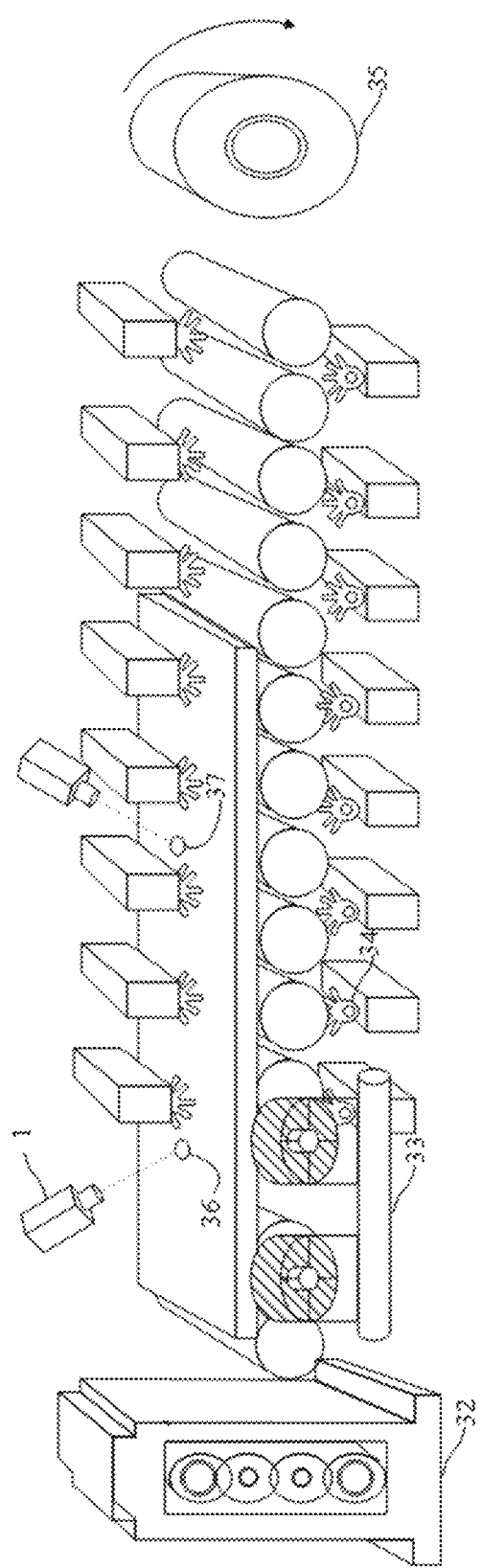
FIG. 4 is a schematic diagram of a temperature measurement deployment in a high-temperature environment for steel hot-rolling according to an embodiment of the present application.

As shown in FIG. 4, the present application provides a schematic deployment diagram of a three-wavelength temperature measurement device 1 adapted to a high-temperature environment for steel hot-rolling. The device can be flexibly moved in an area between an end-of-finishing-rolling rack 32 and a coiler 35. The arrow in FIG. 4 indicates the coiling direction of the coiler 35. At the entrance of the area, an air purging device 33 is provided to form a first temperature measurement area 36 having a water mist disturbance and equipped with air purging. In a laminar flow cooling area, multiple sets of laminar flow cooling nozzles 34 are arranged, to form a second temperature measurement area 37 where a water mist disturbance exists and there is no air purging.

Figure 5:
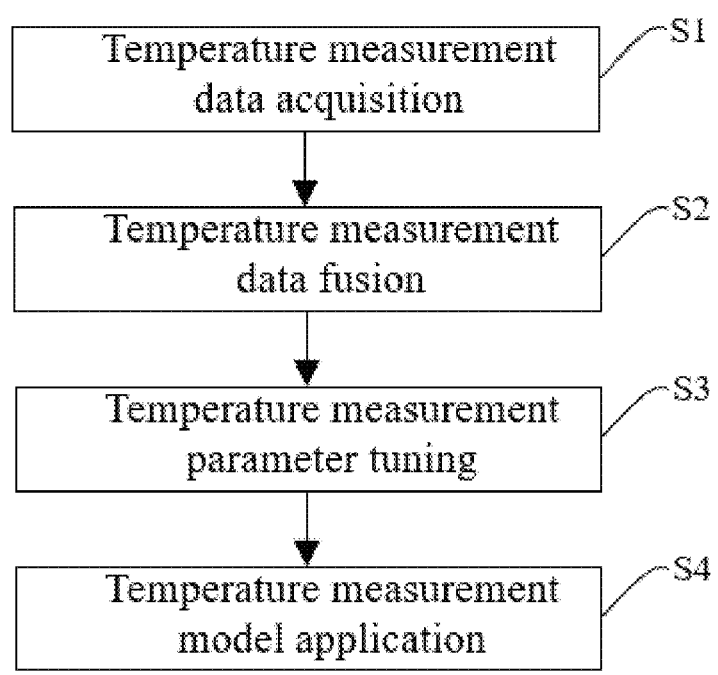
FIG. 5 is a schematic flowchart of a water-mist-penetrating three-wavelength infrared temperature measurement method for a high-temperature environment according to an embodiment of the present application.

As shown in FIG. 5, in another aspect, the present application provides a water-mist-penetrating three-wavelength infrared temperature measurement method for a high-temperature environment, and the method described above includes the following steps:

- step S1. temperature measurement data acquisition: the laser illuminator 8 accurately positions an area to be measured, the first radiation detection assembly 11, the second radiation detection assembly 17, and the third radiation detection assembly 23 receive a light signal at a corresponding wave band and convert the light signal into a corresponding electrical signal, respectively, and after purging by the air purging device 33, the true temperature of a target to be measured is obtained by a ratio temperature measurement method by the computing unit;
- step S2. temperature measurement data fusion: a temperature measurement model is established by the computing unit in consideration of different on-site working conditions to fuse radiation energy ratios under three different wavelength combinations, so as to obtain a final temperature value;
- step S3. temperature measurement parameter tuning: optimal tuning of a temperature measurement model parameter is achieved by the computing unit based on a temperature measurement dataset constructed after multiple times of data acquisition; and
- step S4: temperature measurement model application: in combination with the judgement of abnormally fluctuated temperature measurement data based on camera images, the full-line application of the temperature measurement model is achieved by the computing unit, and the temperature measurement model parameter is updated on-line periodically.

Furthermore, in step S1, the water-mist-penetrating three-wavelength temperature measurement device 1 is utilized for data acquisition in the first temperature measurement area 36 having a water mist disturbance and provided with the air purging device 33, the target to be measured is accurately positioned by the laser illuminator 8, and a first electrical signal 45, a second electrical signal 46 and a third electrical signal 47 converted from corresponding radiation light signals received by the first radiation detection assembly 11, the second radiation detection assembly 17, and the third radiation detection assembly 23 are utilized to obtain radiation energies $M_i(\lambda_1,T_i)$, $M_i(\lambda_2,T_i)$, and $M_i(\lambda_3, T_i)$ for three light paths in the i-th measurement, where $\lambda_1,\lambda_2,\lambda_3$ are central wavelengths allowed to transmit through the first radiation filtering film 10, the second radiation filtering film 16, and the third radiation filtering film 22 of the trichroic prism 9, respectively; $T_i$ is the true temperature of the target to be measured in the i-th measurement, and is approximately obtained based on the ratio of radiation energies under two selected wavelengths $\lambda_m,\lambda_2,m,n \in \{1, 2,3\}$ after purging by the air purging device 33 provided in the area:

$$T_i = \frac{C_2\left(\frac{1}{\lambda_n} - \frac{1}{\lambda_m}\right)}{\ln\left(\frac{M_i(\lambda_m, T_i)}{M_i(\lambda_n, T_i)}\right) - 5\ln\left(\frac{\lambda_n}{\lambda_m}\right)},$$

in the formula, $C_2$ is a second radiation constant.

Furthermore, in step S2, radiation energy ratios for three different wavelength combinations are established in the same measurement based on a ratio temperature measurement principle:

$$R_i^{1,2} = \frac{M_i(\lambda_1, T_i)}{M_i(\lambda_2, T_i)}, R_i^{1,3} = \frac{M_i(\lambda_1, T_i)}{M_i(\lambda_3, T_i)}, R_i^{2,3} = \frac{M_i(\lambda_2, T_i)}{M_i(\lambda_3, T_i)}.$$

Considering the disturbance such as water mist, vapor, etc. affecting radiation at each wavelength, the emissivities, which are not exactly the same at different wavelengths, of the high-temperature target to be measured, and the varied temperature measurement accuracy for different wavelength combinations under various working conditions (such as a production mode, ambient temperature and humidity, etc.), a temperature measurement model f is established to obtain a final temperature measurement value $\hat{T}_i$:

$$\hat{T}_i = f(R_i^{1,2}, R_i^{1,3}, R_i^{2,3}, \alpha_i; \theta)$$

in the formula, $\alpha \in \{1, 2, \ldots, N\}$ represents different production working conditions, and $\theta$ is a model parameter.

Furthermore, in step S3, the data storage and processing analysis module stores related temperature measurement data, and based on a dataset obtained after L times of data acquisition $\{T_i, M_i(\lambda_1,T_i), M_i(\lambda_2,T_i), M_i(\lambda_3,T_i), \alpha_i\}_{i=1}^{L}$, an optimal temperature measurement model parameter $\theta^*$ is obtained:

$$\theta^* = \arg\min_{\theta} \sum_{j=1}^{L} (T - f(R_j^{12}, R_j^{13}, R_j^{23}, \alpha_j; \theta))^2.$$

In the formula, a temperature measurement model f is established using a multilayer feed-forward network, and a neural-network temperature measurement model parameter $\theta$ is iteratively updated by means of gradient descent.

Furthermore, in step S4, considering the correlation of similar area environments, the temperature measurement model parameter is applicable to other section in a high-temperature environment where water mist and vapor disturbances exist and it is difficult to fully realize purging, so as to relatively accurately measure the temperature of the target to be measured. When an output of the temperature measurement model fluctuates abnormally, whether the target to be measured has an abnormal state and whether there is a severe water-vapor water-mist disturbance in a measurement light path are determined based on the image acquired by the camera 7, and in combination with machine vision and expert experience. If the abnormal state or disturbance described above exists, the fluctuated data is discarded; and if the abnormal state or disturbance described above does not exist, the temperature measurement data is accepted. In addition, the temperature measurement model parameter is periodically updated based on accumulated historical temperature measurement data.

Figure 6:
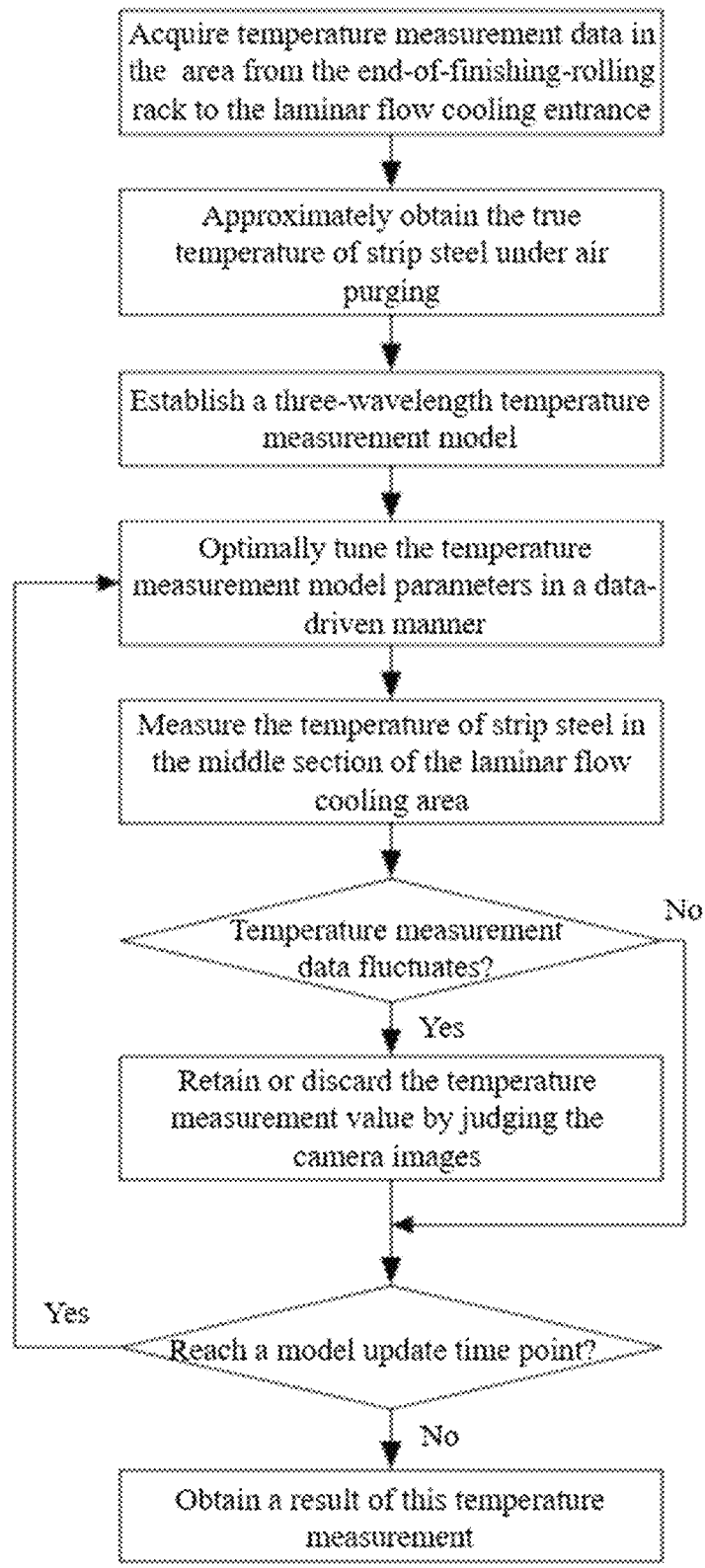
FIG. 6 is a schematic flowchart of a water-mist-penetrating three-wavelength infrared temperature measurement method for a high-temperature environment of a steel hot-rolling production according to an embodiment of the present application.

As shown in FIG. 6, taking a typical high-temperature environment, a production process for steel hot-rolling, as an example, it is a flow diagram of the water-mist-penetrating three-wavelength infrared temperature measurement method for a high-temperature environment, with specific steps as follows:

step 1. considering that a temperature measurement range for a steel hot-rolling process needs to cover 500° C. to 1200° C., based on a blackbody radiation spectrum curve, three temperature measurement wavelengths are sequentially selected as $\lambda_1=800$ nm, $\lambda_2=900$ nm, and $\lambda_3=1000$ nm. For the first temperature measurement, area 36 between an end-of-finishing-rolling rack and a laminar flow cooling entrance, the three-wavelength temperature measurement device 1 of the present application is used for data acquisition, to obtain radiation energies $M_i(\lambda_1,T_i)$, $M_i(\lambda_2,T_i)$, and, $M_i(\lambda_3,T_i)$ for three light paths in the i-th measurement, respectively, wherein $T_i$ is the true temperature of strip steel in the i-th measurement, and is approximately obtained based on the ratio of radiation energies under two selected wavelengths $\lambda_1$ and $\lambda_2$ after purging by the air purging device 33 arranged at this position in a rolling line:

$$T_i = \frac{C_2\left(\frac{1}{\lambda_n} - \frac{1}{\lambda_m}\right)}{\ln\left(\frac{M_i(\lambda_m, T_i)}{M_i(\lambda_n, T_i)}\right) - 5\ln\left(\frac{\lambda_n}{\lambda_m}\right)},$$

in the formula, $C_2$ is a second radiation constant.

In step 2, radiation energy ratios for three different wavelength combinations are established in the same measurement based on a ratio temperature measurement principle:

$$R_i^{1,2} = \frac{M_i(\lambda_1, T_i)}{M_i(\lambda_2, T_i)}, \quad R_i^{1,3} = \frac{M_i(\lambda_1, T_i)}{M_i(\lambda_3, T_i)}, \quad R_i^{2,3} = \frac{M_i(\lambda_2, T_i)}{M_i(\lambda_3, T_i)}.$$

Taking radiation energy ratio $R_i^{1,2}$, as an example, having an expression formula as follows, and considering a difference between impact $\kappa_1$ and impact $\kappa_2$ of a disturbance such as water mist, vapor, etc. on the radiation at wavelength $\lambda_1$ and the radiation at wavelength $\lambda_2$, and emissivities $\varepsilon(\lambda_1,T)$ and $\varepsilon(\lambda_2,T)$, which are not exactly the same at the two wavelengths, of strip steel:

$$R_i^{1,2} = \frac{\kappa_1\varepsilon(\lambda_1, T)\lambda_1^{-5}e^{\frac{-C_2}{\lambda_1 T}}}{\kappa_2\varepsilon(\lambda_2, T)\lambda_2^{-5}e^{\frac{-C_2}{\lambda_2 T}}},$$

and also, considering the varied temperature measurement accuracy for different wavelength combinations under various working conditions (such as a rolling mode, ambient temperature and humidity, etc.), a Back Propagation Neural Network (BPNN) temperature measurement model f with 1 hidden layer is established to fuse the energy ratios for the three wavelength combinations, to obtain a final temperature measurement value $\hat{T}_i$:

$$\hat{T}_i = f(R_i^{1,2}, R_i^{1,3}, R_i^{2,3}, \alpha_i; \theta)$$

in the formula, $\alpha \in \{1, 2, \ldots, N\}$ represents different hot-rolling production working conditions, and $\theta$ is a model parameter.

In step 3, the data storage and processing analysis module stores related temperature measurement data, so as to, based on a dataset obtained after L times of data acquisition $\{T_i, M_i(\lambda_1,T_i), M_i(\lambda_2,T_i), M_i(\lambda_3,T_i), \alpha_i\}_{i=1}^{L}$, obtain an optimal temperature measurement model parameter $\theta^*$:

$$\theta^* = \operatorname*{argmin}_{\theta} \sum_{i=1}^{L} (T_i - f(R_i^{1,2}, R_i^{1,3}, R_i^{2,3}, \alpha_i; \theta))^2,$$

in the formula, a specific mode for finding an optimal parameter is: randomly selecting $P(P \leq L)$ data combinations with indexes $\{i_1, i_2, \ldots, i_P\}$ from a dataset each time, and iteratively updating the temperature measurement model parameter $\theta$ by means of gradient descent:

$$\theta \leftarrow \theta - l_\theta \nabla_\theta \frac{1}{P} \sum_{j=1}^{P} (T_{i_j} - f(R_{i_j}^{1,2}, R_{i_j}^{1,3}, R_{i_j}^{2,3}, \alpha_{i_j}; \theta))^2,$$

in the formula, $l_\theta$ is a learning rate of parameter updating, and $\nabla_\theta$ is a gradient operation symbol on $\theta$.

In step 4, considering the correlation of similar area environments in a hot-rolling line, the temperature measurement model parameter is applicable to a section in laminar flow cooling or the like, e.g., the second temperature measurement area 37 in a laminar flow cooling area, where water mist and vapor disturbances exist and it is difficult to fully realize purging, so as to relatively accurately measure the temperature of the strip steel. When an output of the temperature measurement model fluctuates abnormally, the image obtained by the camera 7 is subjected to analysis and anomaly detection, to judge whether an abnormal point such as iron oxide scale, etc., or a severe water-vapor water-mist disturbance exists in the area to be measured. If the abnormal point or disturbance described above exists, the abnormal data is discarded; and if the abnormal point or disturbance described above does not exist, the temperature measurement data is accepted. In addition, the temperature measurement model parameter is periodically updated based on accumulated historical temperature measurement data.

Preferred specific embodiments of the present invention are described in detail above. It should be understood that those of ordinary skill in the art can make various modifications and variations according to the conception of the present invention without the exercise of inventive effort. Therefore, any technical solution that can be obtained by a person skilled in the art by logical analysis, reasoning, or limited experimentation on the basis of the prior art according to the conception of the present invention shall fall within the scope of protection determined by the claims.

The invention claimed is:

1. A water-mist-penetrating three-wavelength temperature measurement device for an environment in steel hot rolling, comprising:
   a housing, the housing provided with an optical aperture, the aperture configured to be able to permit passage of light signals emitted from a target to be measured;
   a three-waveband beam splitting detection module, the three-waveband beam splitting detection module arranged in the housing, and comprising a trichroic prism, a first radiation detection assembly, a second radiation detection assembly and a third radiation detection assembly; the trichroic prism having an incident face, a first emission face, a second emission face, and a third emission face, and configured to be able to receive the light signals entering via the optical aperture through the incident face, and emit radiation signals having different wavelength bands through the first emission face, the second emission face, and the third emission face, respectively; the first radiation detection assembly configured to be able to receive a first radiation signal having a first wavelength band emitted from the first emission face, and convert the first radiation signal into a first electrical signal; the second radiation detection assembly configured to be able to receive a second radiation signal having a second wavelength band emitted from the second emission face, and convert the second radiation signal into a second electrical signal; the third radiation detection assembly configured to be able to receive a third radiation signal having a third wavelength band emitted from the third emission face, and convert the third radiation signal into a third electrical signal; and a computing unit, the computing unit configured to be able to receive the first electrical signal, the second electrical signal, and the third electrical signal, and perform calculation and analysis to determine a temperature value of the target to be measured.

2. The water-mist-penetrating three-wavelength temperature measurement device for an environment in steel hot rolling according to claim 1, wherein the first emission face is provided with a first radiation filtering film, the first radiation filtering film is configured to be able to permit transmission of the first radiation signal having the first wavelength band; the second emission face is provided with a second radiation filtering film, the second radiation filtering film is configured to be able to permit transmission of the second radiation signal having the second wavelength band; and the third emission face is provided with a third radiation filtering film, the third radiation filtering film is configured to be able to permit transmission of the third radiation signal having the third wavelength band.

3. The water-mist-penetrating three-wavelength temperature measurement device for an environment in steel hot rolling according to claim 1, wherein the first radiation detection assembly comprises a first focusing lens, a first radiation detector, a first circuit board, and a first stray light shielding tube, the first radiation detector is arranged on the first circuit board, the first focusing lens and the first radiation detector are sleeved in the first stray light shielding tube, the first circuit board is electrically connected to the computing unit, the first focusing lens is configured to be able to receive the first radiation signal emitted from the first emission face and concentrate the first radiation signal onto the first radiation detector, the first radiation detector is configured to be able to convert the received first radiation signal into the first electrical signal, the first circuit board is configured to be able to transmit the first electrical signal to the computing unit; the second radiation detection assembly comprises a second focusing lens, a second radiation detector, a second circuit board, and a second stray light shielding tube, the second radiation detector is arranged on the second circuit board, the second focusing lens and the second radiation detector are sleeved in the second stray light shielding tube, the second circuit board is electrically connected to the computing unit, the second focusing lens is configured to be able to receive the second radiation signal emitted from the second emission face and concentrate the second radiation signal onto the second radiation detector, the second radiation detector is configured to be able to convert the received second radiation signal into the second electrical signal, the second circuit board is configured to be able to transmit the second electrical signal to the computing unit; and the third radiation detection assembly comprises a third focusing lens, a third radiation detector, a third circuit board, and a third stray light shielding tube, the third radiation detector is arranged on the third circuit board, the third focusing lens and the third radiation detector are sleeved in the third stray light shielding tube, the third circuit board is electrically connected to the computing unit, the third focusing lens is configured to be able to receive the third radiation signal emitted from the third emission face and concentrate the third radiation signal onto the third radiation detector, the third radiation detector is configured to be able to convert the received third radiation signal into the third electrical signal, the third circuit board is configured to be able to transmit the third electrical signal to the computing unit.

4. The water-mist-penetrating three-wavelength temperature measurement device for an environment in steel hot rolling according to claim 1, further comprising a video monitoring module, the video monitoring module comprising a camera and a first semi-transparent and semi-reflective mirror; the first semi-transparent and semi-reflective mirror arranged between the optical aperture and the trichroic prism, and configured to able to transmit a part of the light signals to the trichroic prism, and reflect the other part of the light signals and transfer it to the camera; and the camera configured to be able to receive the light signals to achieve imaging.

5. The water-mist-penetrating three-wavelength temperature measurement device for an environment in steel hot rolling according to claim 1, further comprising a laser indication module, the laser indication module comprising a laser illuminator and a second semi-transparent and semi-reflective mirror, the second semi-transparent and semi-reflective mirror arranged between the optical aperture and the trichroic prism, and configured to able to transmit the light signals to the trichroic prism, and reflect a laser signal emitted by the laser illuminator and project the laser signal onto the target to be measured via the optical aperture.

6. The water-mist-penetrating three-wavelength temperature measurement device for an environment in steel hot rolling according to claim 1, further comprising a monitor, the monitor electrically connected to the computing unit.

7. The water-mist-penetrating three-wavelength temperature measurement device for an environment in steel hot rolling according to claim 1, wherein the optical aperture is provided with a quartz window.

8. The water-mist-penetrating three-wavelength temperature measurement device for an environment in steel hot rolling according to claim 7, wherein the optical aperture is provided with a shoulder, and the quartz window is arranged onto the shoulder.

9. The water-mist-penetrating three-wavelength temperature measurement device for an environment in steel hot rolling according to claim 1, wherein a protection sleeve is provided outside the housing surrounding the optical aperture.

10. The water-mist-penetrating three-wavelength temperature measurement device for an environment in steel hot rolling according to claim 9, wherein the protection sleeve is provided with an air blow hole in its peripheral wall, and the air blow hole is connected to an air blowing device.

11. The water-mist-penetrating three-wavelength temperature measurement device for an environment in steel hot rolling according to claim 9, wherein the protection sleeve is threadedly connected to the housing.

12. The water-mist-penetrating three-wavelength temperature measurement device for an environment in steel hot rolling according to claim 1, further comprising an electrical interface, the electrical interface being electrically connected to an external apparatus.

13. The water-mist-penetrating three-wavelength temperature measurement device for an environment in steel hot rolling according to claim 1, wherein a water-cooling jacket is provided outside the housing.

14. A temperature measurement method using a water-mist-penetrating three-wavelength temperature measurement device for an environment in steel hot rolling, the water-mist-penetrating three-wavelength temperature measurement device comprising:
  a housing, the housing provided with an optical aperture, the aperture configured to be able to permit passage of light signals emitted from a target to be measured;
  a three-waveband beam splitting detection module, the three-waveband beam splitting detection module arranged in the housing, and comprising a trichroic prism, a first radiation detection assembly, a second radiation detection assembly and a third radiation detection assembly; the trichroic prism having an incident face, a first emission face, a second emission face, and a third emission face, and configured to be able to receive the light signals entering via the optical aperture through the incident face, and emit radiation signals having different wavelength bands through the first emission face, the second emission face, and the third emission face, respectively; the first radiation detection assembly configured to be able to receive a first radiation signal having a first wavelength band emitted from the first emission face, and convert the first radiation signal into a first electrical signal; the second radiation detection assembly configured to be able to receive a second radiation signal having a second wavelength band emitted from the second emission face, and convert the second radiation signal into a second electrical signal; the third radiation detection assembly configured to be able to receive a third radiation signal having a third wavelength band emitted from the third emission face, and convert the third radiation signal into a third electrical signal;
  a computing unit, the computing unit configured to be able to receive the first electrical signal, the second electrical signal, and the third electrical signal, and perform calculation and analysis to determine a temperature value of the target to be measured;
  a video monitoring module, the video monitoring module comprising a camera and a first semi-transparent and semi-reflective mirror; the first semi-transparent and semi-reflective mirror arranged between the optical aperture and the trichroic prism, and configured to able to transmit a part of the light signals to the trichroic prism, and reflect the other part of the light signals and transfer it to the camera; and the camera configured to be able to receive the light signals to achieve imaging; and
  a laser indication module, the laser indication module comprising a laser illuminator and a second semi-transparent and semi-reflective mirror, the second semi-transparent and semi-reflective mirror arranged between the optical aperture and the trichroic prism, and configured to able to transmit the light signals to the trichroic prism, and reflect a laser signal emitted by the laser illuminator and project the laser signal onto the target to be measured via the optical aperture;

and the temperature measurement method comprising:
  step 1. temperature measurement data acquisition: after an area to be measured is positioned by the laser indication module, receiving a radiation signal at a corresponding wavelength band and convert the radiation signal into a corresponding electrical signal, respectively, by the first radiation detection assembly, the second radiation detection assembly and the third radiation detection assembly, and after purging by an air purging device, obtaining an true temperature of the target to be measured by a ratio temperature measurement method by the computing unit;
  step 2. temperature measurement data fusion: establishing a temperature measurement model by the computing unit based on on-site working conditions to fuse radiation energy ratios under three different wavelength combinations, so as to obtain a final temperature value;
  step 3. temperature measurement parameter tuning: achieving optimal tuning of a temperature measurement model parameter by the computing unit based on a temperature measurement dataset constructed after data acquisition; and
  step 4: temperature measurement model application: in combination with the judgement for abnormally fluctuated temperature measurement data based on camera images, achieving a full-line application of the temperature measurement model by the computing unit, and updating the temperature measurement model parameter periodically.

15. The method according to claim 14, wherein in the step 1, the water-mist-penetrating three-wavelength temperature measurement device is utilized for temperature measurement data acquisition in an area having a water mist disturbance and provided with an air purging device, the target to be measured is positioned by the laser illuminator, and the first electrical signal, the second electrical signal and the third electrical signal converted from radiation signals received by the first radiation detection assembly, the second radiation detection assembly and the third radiation detection assembly are utilized to obtain radiation energies $M_i(\lambda_1, T_i)$, $M_i(\lambda_2, T_i)$, and $M_i(\lambda_3, T_i)$ for the first radiation signal, the second radiation signal and the third radiation signal in an i-th measurement, where $\lambda_1$, $\lambda_2$, $\lambda_3$ are central wavelengths allowed to transmit through a first radiation filtering film, a second radiation filtering film and a third radiation filtering film of the trichroic prism, respectively; and $T_i$ is the true temperature of the target to be measured in the i-th measurement, and, based on the ratio of radiation energies under two selected wavelengths $\lambda_m, \lambda_n, m, n \in \{1, 2, 3\}$ after purging by the air purging device, approximately is:

$$T_i = \frac{C_2\left(\frac{1}{\lambda_n} - \frac{1}{\lambda_m}\right)}{\ln\left(\frac{M_i(\lambda_m, T_i)}{M_i(\lambda_n, T_i)}\right) - 5\ln\left(\frac{\lambda_n}{\lambda_m}\right)},$$

where, $C_2$ is a second radiation constant.

16. The method according to claim 14, wherein in the step 2, the radiation energy ratios for the three different wavelength combinations are established in the same measurement based on a ratio temperature measurement principle:

$$R_i^{1,2} = \frac{M_i(\lambda_1, T_i)}{M_i(\lambda_2, T_i)}, R_i^{1,3} = \frac{M_i(\lambda_1, T_i)}{M_i(\lambda_3, T_i)}, R_i^{2,3} = \frac{M_i(\lambda_2, T_i)}{M_i(\lambda_3, T_i)}$$

considering the disturbance of water mist and vapor, affecting radiation at each wavelength, the emissivities, which are not exactly the same at different wavelengths, of the target to be measured, and the varied temperature measurement accuracy for different wavelength combinations under various working conditions, a temperature measurement model f is established to obtain a final temperature measurement value $\hat{T}_i$:

$$\hat{T}_i = f(R_i^{1,2}, R_i^{1,3}, R_i^{2,3}, \alpha_i; \theta)$$

where, $\alpha \in \{1, 2, \ldots, N\}$ represents different production working conditions, and $\theta_i$ is a model parameter.

17. The method according to claim 14, wherein in the step 3, the computing unit stores related temperature measurement data, a dataset obtained based on L times of data acquisition is $\{T_i, M_i(\lambda_1, T_i), M_i(\lambda_2, T_i), M_i(\lambda_3, T_i), \alpha_i\}_{i=1}^{L}$, and an obtained optimal temperature measurement model parameter $\theta^*$ is:

$$\theta^* = \operatorname*{argmin}_{\theta} \sum_{i=1}^{L} \left(T - f(R^{1,2}, R^{1,3}, R^{2,3}, \alpha_i; \theta)\right)^2$$

where, a temperature measurement model f is established using a multilayer feed-forward network, and a neural-network temperature measurement model parameter $\theta_i$ is iteratively updated by means of gradient descent.

18. The method according to claim 14, wherein in the step 4, considering the correlation of similar area environments, the parameter of the temperature measurement model is configured to be able to be used in other section where water mist and vapor disturbances exist and it is difficult to fully realize purging, to obtain the actual temperature of the target to be measured.

19. The method according to claim 14, wherein in the step 4, when an output of the temperature measurement model fluctuates abnormally, whether the target to be measured has an abnormal state and whether there is a severe water-vapor water-mist disturbance in a measurement light path are determined based on images acquired by the camera, and in combination with machine vision and expert experience; if the abnormal state or disturbance exists, the fluctuated data is discarded; if no abnormal state or disturbance exists, obtained temperature measurement data is accepted.

20. The method according to claim 14, wherein the step 4 further comprises: periodically updating the temperature measurement model parameter based on accumulated historical temperature measurement data.

* * * * *